Figure 1:
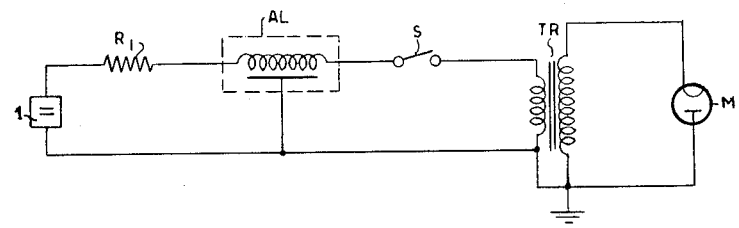

Sept. 27, 1955  F. KRIENEN  2,719,237
PULSE GENERATOR
Filed Oct. 19, 1951

INVENTOR
Frank Krienen
By
Agent

United States Patent Office 2,719,237
Patented Sept. 27, 1955

2,719,237

PULSE GENERATOR

Frank Krienen, Amsterdam, Netherlands, assignor to Hartford National Bank and Trust Company, Hartford, Conn., as trustee Application October 19, 1951, Serial No. 252,028

Claims priority, application Netherlands October 26, 1950

3 Claims. (Cl. 307—106)

This invention relates to pulse generators comprising an artificial line consisting of several sections, the load being connected by way of a pulse transformer to the artificial line. Such pulse generators may more particularly be used for supplying magnetrons in radar apparatus, pulse communication apparatus, altimeters or the like.

With such pulse generators comprising an artificial line it is known to compose the latter of several sections each including a series-inductor and a parallel-capacitor and/or a series-capacitor. For producing pulses the artificial line may first be charged to a high direct voltage, followed by discharging the artificial line through the load resistor by means of a switch consisting of an electron-discharge tube, a gas-filled tube or a spark gap, the artificial line supplying a pulse whose duration of, say, approximately 1 millisecond depends upon the length of the artificial line. The load resistor is usually not directly connected to the artificial line, but through a pulse-transformer inter alia in order that the output voltage of the artificial line may be stepped up.

By such pulse transformers the pulses supplied by the artificial line must be transmitted with minimum distortion and losses, notably if the pulse power is large, for example in modern radar apparatus, the efficiency of usual pulse transformers being approximately 95%.

In usual pulse transformers special attention is bestowed on minimizing the stray self-inductance in order to ensure satisfactory transmission of the high frequencies of the pulse-frequency spectrum. Particularly if the pulse duration is lower than 1 millisecond, for example 0.1 to 0.25 millisecond, difficulties arise in designing the transformer owing to the then required small spacing between primary and secondary windings, so that particularly stringent conditions are imposed on insulation. The self-inductance of the primary transformer winding must then generally be made comparatively low, but this militates against the condition of minimizing the magnetisation current for satisfactory transmission of the pulse peaks.

With the use of a pulse transformer connected to an artificial line having, for example, ten sections the attempts are usually directed, when viewed in a substitution diagram wherein each section of the artificial line includes a series-inductor and a parallel capacitor, to making the product of the values of series-inductor and parallel-capacitor per section equal to the product of the stray self-inductance of the pulse transformer and the effective capacity between the primary terminals of the pulse transformer, the latter capacity being chiefly determined by the capacity between the primary and secondary transformer windings. The stray self-inductance and the effective capacity between the primary terminals of the transformer may then be considered as a section resembling a section of the artificial line, the ratio between the stray self-inductance and effective capacity approximately corresponding to the ratio between the series self-inductance and the parallel-capacity per line section. This proportioning yields satisfactory results provided the number of sections of the artificial line be comparatively large, for example 9 to 10, since otherwise the losses due to the stray self-inductance of the transformer attain an unduly high value.

The present invention has for its object to provide a different construction of pulse generators of the aforesaid type, which are particularly suitable for use in producing pulses of very short duration, say 0.1 millisecond, and high power, notably when employing an artificial line consisting only of a few (2 to 4) sections.

According to the invention the ratio between the stray self-inductance of the pulse transformer and the effective capacity between the primary terminals of the pulse transformer is preferably made large relatively to the square of the surge impedance of the artificial line, the stray self-inductance of the pulse transformer corresponding at least to the series self-inductance per cable section and constituting the series self-inductance of the last line section.

In an advantageous form of pulse generator according to the invention, the artificial line comprises in all only 2 to 4 sections so that the stray self-inductance of the transformer, considering the different proportions of the terminal sections due to the small number of sections, is well over ½ to ¼ of the total self-inductance of the artificial line.

Figure 2:
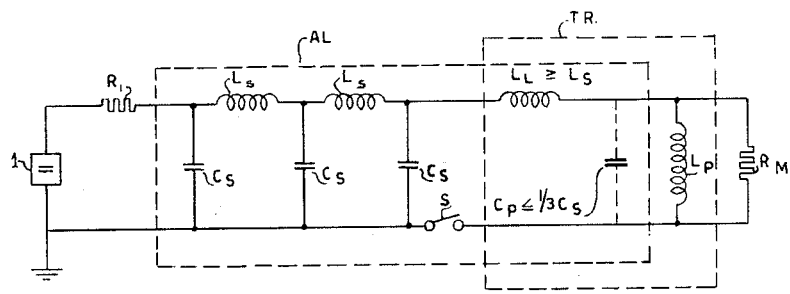

In order that the invention may be readily carried into effect it will now be described in greater detail with reference to the accompanying drawing, given by way of example, in which:

Fig. 1 represents diagrammatically a known pulse generator of the aforesaid type, and Fig. 2 shows the substitution diagram of a pulse generator according to the invention and comprising an artificial line having in all three sections.

In Fig. 1, the reference numeral 1 denotes a source of direct current which is connected through a high resistor $R_1$ to an artificial line AL for charging it. By means of a switch S the primary winding of a pulse transformer TR is connected to the artificial line AL, a magnetron M constituting the load being connected in parallel with the secondary of this transformer. Each time switch S is closed, the artificial line AL discharges and supplies a pulse to the magnetron M of a duration determined by the transmission time of the artificial line. The secondary of the transformer TR may, as customary, be bifilar in connection with the supply of heating current to the cathode of the magnetron.

The circuit-arrangement shown in Fig. 1 may be represented by a substitution diagram of the type shown in Fig. 2. In drawing this substitution diagram it has however been assumed that the circuit shown in Fig. 1 corresponds to the present invention.

In the substitution diagram shown in Fig. 2, the reference numeral 1 again denotes a source of direct current connected by way of a high resistor $R_1$ to one end of the artificial line AL. The artificial line has in all three sections each consisting of a series inductor and a parallel capacitor. The series inductors of the first and the second section are designated $L_s$, the parallel capacitors $C_s$. The third section consists of a parallel capacitor $C_s$ and a series inductor LL, the latter consisting of the stray self-inductance $L_s$ of the pulse transformer represented by TR. Apart from the switch S, which is closed periodically during operation the input terminals of the pulse transformer are directly connected to the output terminals of the second line section and the parallel capacitor, connected in between, of the third line section. As usual, the substitution diagram of transformer TR further shows a parallel coil $L_p$ shunted by an effective transformer capacitor $C_p$. The load represented by a resistor $R_M$ and the magnetron is connected to the transformer.

According to the invention the stray self-inductance $L_L$ is made a little higher, in this case 10 to 30%, than the series-inductance $L_s$ per line section. Since, consequently, this stray self-inductance $L_L$ is well over ⅓ of the overall series self-inductance of the artificial line, the abnormally high value of the stray self-inductance must be accounted for in proportioning the pulse transformer TR, even if the duration of the pulses to be produced is comparatively small, for example 0.1 millisecond, so that the overall series self-inductance of the artificial line is low. According to the invention the possibility this created of making the stray self-inductance of the transformer abnormally high is utilised to advantage. Thus, for example, the capacity between the primary and secondary transformer winding may now be reduced, by comparatively wide spacing of the windings, to a value such that the substitution capacity $C_p$ in the diagram shown in Fig. 2 is low in comparison with the parallel capacity $C_s$ per line section. In a practical embodiment, the parallel capacity $C_p$ may be made smaller than ⅓ of the parallel capacity per line section. The abnormally high stray self-inductance of the pulse transformer thus permits a comparatively thick layer of insulating material to be provided between the primary and the secondary transformer winding, which enables the transmission of particularly high voltages. Moreover, the permissible high stray self-inductance allows of the transformer inductance to be made high, which involved difficulties in known proportioning. Furthermore, the permissible high stray self-inductance may be taken advantage of to reduce the construction length of the transformer, special expedients with respect to the relative positioning of the primary and the secondary winding, as are necessary for attaining a high coupling factor in usual forms of construction, being superfluous.

In a practical embodiment, wherein the primary and the secondary transformer windings consisted of concentric, cylindrical entirely separated coils, the capacity $C_p$ was found to have such a low value that in designing the last line section it did not need to be accounted for at all, even at a pulse duration of 0.1 millisec.

It will now be clear that, in contradistinction to common constructions, with the aforesaid proportioning of the artificial line and pulse transformer the ratio between the stray self-inductance of the transformer and the effective capacity between the primary winding terminals is high relatively to the square of the surge impedance of each line section, corresponding to the ratio $L_s/C_s$. In this practical embodiment the quotient of the said ratio corresponded to a factor 3.5.

It will be evident that the invention may not only be used with artificial lines composed of sections including parallel capacitors but also if the line sections comprise series capacitors. In the last-mentioned case, also, the substitution diagram may be drawn as shown in Figure 2.

What I claim is:

1. A pulse generator supplying pulses of brief duration to a load such as a magnetron; comprising a main artificial line provided with a plurality of substantially like sections each having a series inductor and a shunt capacitor, a switching device, a pulse transformer having input terminals and output terminals, means to apply a potential through said line and said device to the input terminals of said transformer, and means connecting said output terminals to said load, said transformer having a stray inductance and an effective capacitance constituting the series inductor and the shunt capacitor of an additional artificial line section, said stray inductance having a value at least equal to the value of a series inductor in said main line, said stray inductance and said effective capacitance having relative values at which the ratio therebetween is large with respect to the square of the surge impedance of said main line.

2. A generator, as set forth in claim 1, wherein said main line has a maximum of three sections and wherein said stray self-inductance has a value at least one-fourth the overall series self-inductance of said main line.

3. A pulse generator, as set forth in claim 1, wherein said ratio of stray self-inductance to effective capacity is at least three times the square of said surge impedance.

References Cited in the file of this patent

UNITED STATES PATENTS

| | | |
|---|---|---|
| 2,394,389 | Lord | Feb. 5, 1946 |
| 2,412,893 | Lee | Dec. 17, 1946 |